United States Patent
Ross et al.

(10) Patent No.: US 10,124,964 B2
(45) Date of Patent: Nov. 13, 2018

(54) SPIRAL CLEAN PULLEY

(71) Applicant: Douglas Manufacturing Co., Inc., Pell City, AL (US)

(72) Inventors: Paul Ross, Pell City, AL (US); Benjamin Brewer, Pell City, AL (US); Alberto Chamorro, Pell City, AL (US); Dennis Grizzell, Pell City, AL (US); Jeffery Carlisle, Pell City, AL (US)

(73) Assignee: Douglas Manufacturing Co., Inc., Pell City, AL (US)

( * ) Notice: Subject to any disclaimer, the term of this patent is extended or adjusted under 35 U.S.C. 154(b) by 0 days.

(21) Appl. No.: 15/605,916

(22) Filed: May 25, 2017

(65) Prior Publication Data

US 2018/0057269 A1    Mar. 1, 2018

Related U.S. Application Data

(60) Provisional application No. 62/381,946, filed on Aug. 31, 2016.

(51) Int. Cl.
| | |
|---|---|
| B65G 45/20 | (2006.01) |
| F16H 55/36 | (2006.01) |
| F16H 55/56 | (2006.01) |
| B65G 39/073 | (2006.01) |
| B65G 45/00 | (2006.01) |
| F16H 57/04 | (2010.01) |

(52) U.S. Cl.
CPC .......... *B65G 39/073* (2013.01); *B65G 45/20* (2013.01); *F16H 55/36* (2013.01); *F16H 55/566* (2013.01); *B65G 45/00* (2013.01); *F16H 57/04* (2013.01)

(58) Field of Classification Search
CPC ............................ B65G 39/073; F16H 55/36
USPC .......... 198/832, 835, 494–498; 474/188, 189
See application file for complete search history.

(56) References Cited

U.S. PATENT DOCUMENTS

| | | | | |
|---|---|---|---|---|
| 1,980,777 A | * | 11/1934 | Zollinger | ............. B65G 39/071 198/501 |
| 2,087,813 A | * | 7/1937 | Peterson | ................ B65G 23/04 119/53 |
| 2,886,169 A | | 5/1959 | Calder | |
| 3,626,773 A | | 12/1971 | Loeffler | |
| 4,180,155 A | | 12/1979 | Stevick | |
| 4,324,495 A | * | 4/1982 | Martinez | ................... E04D 5/02 198/498 |
| 4,499,992 A | * | 2/1985 | Paulson | ............... B65G 39/073 198/498 |
| 4,913,279 A | * | 4/1990 | Tonissen | .............. B65G 39/073 198/498 |

(Continued)

OTHER PUBLICATIONS

Sales brochure from Applicant for related product publicly available as early as 2008-2009.

*Primary Examiner* — William R Harp
(74) *Attorney, Agent, or Firm* — Bush Intellectual Property Law; Kenneth M. Bush

(57) ABSTRACT

A conveyor pulley design incorporates a plow design that forces tramp material away from the belt and discharges material down and away from the belt, bearings, take-up assembly, maintenance equipment and personnel. The pulley uses a modular construction that allows for optimized manufacture and inventory processes and reduces the materials cost in the pulley.

12 Claims, 5 Drawing Sheets

(56) References Cited

U.S. PATENT DOCUMENTS 8,739,965 B2 * 6/2014 Laughlin .............. B65G 39/073
198/835

* cited by examiner

SPIRAL CLEAN PULLEY

FIELD OF INVENTION

The present invention relates to a pulley for a conveyer system and in even greater particularity to a self-cleaning pulley that provides excellent support to the belt of the system. In greater particularity, our innovation allows for modular construction of cores, end plows, and center sections of a pulley. The core can be uniformly sized for use on multiple pulley diameter sizes. In a similar manner, the end plows and center section can be used on all pulley face widths of the same diameter. In addition to modularity, our invention relates to the load bearing and self-cleaning design of such pulleys.

BACKGROUND

Roller pulleys in conveyor systems suffer from the inherent accumulation of tramp material on the belt as the material passes between the belt and the pulley. Numerous designs have been proposed to open the solid surface of the roller pulley with a number of supporting structures, however each of these attempts has had limitations in terms of belt support, tramp migration, and effectiveness. Known roller pulleys which attempt to open the solid surface are generally customized for use on a specific size conveyor, thus in the manufacturing process efficiencies of manufacture are not obtained because each size roller pulley has its own manufacturing setup cost.

SUMMARY OF THE INVENTION

A general object of the invention is to provide improved roller pulley cleaning while retaining superior belt support in a roller pulley. A further object of the invention is to modularize the manufacture of the roller pulley such that a variety of sizes of roller pulleys may be effectively manufactured.

BRIEF DESCRIPTION OF THE DRAWINGS

Referring to the drawings which are appended hereto and which form a portion of this disclosure, it may be seen that.

DETAILED DESCRIPTION

Figure 1:
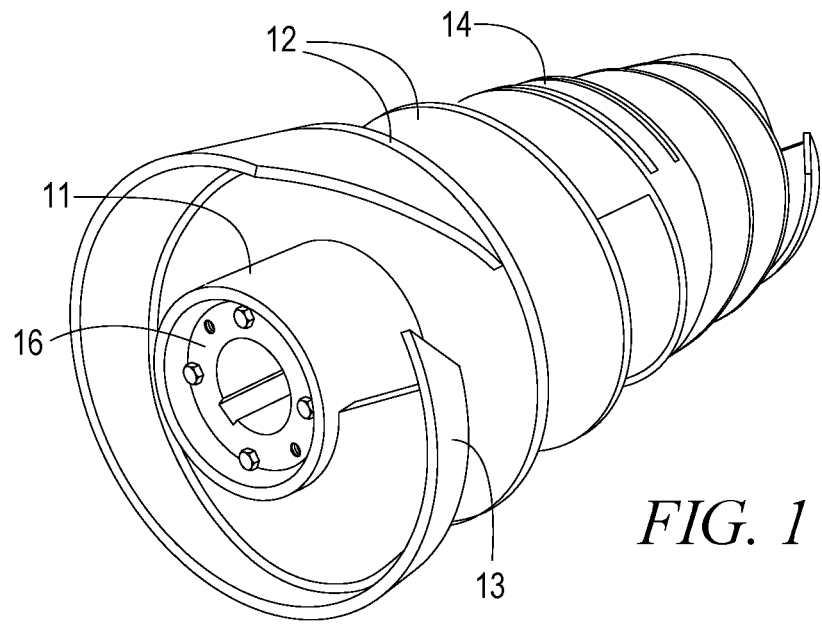
FIG. 1 is an end perspective view of an embodiment of our improved pulley.
Figure 2:
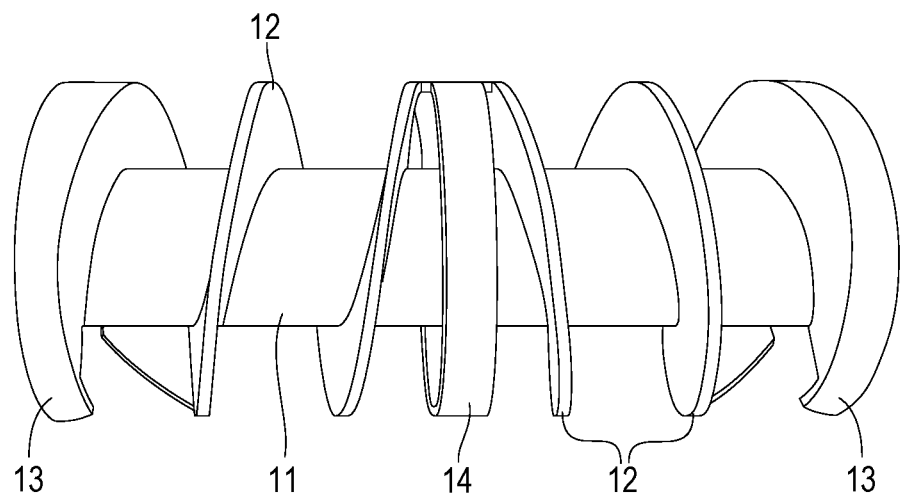
FIG. 2 is a side elevation view of an embodiment of our improved pulley.
Figure 3:
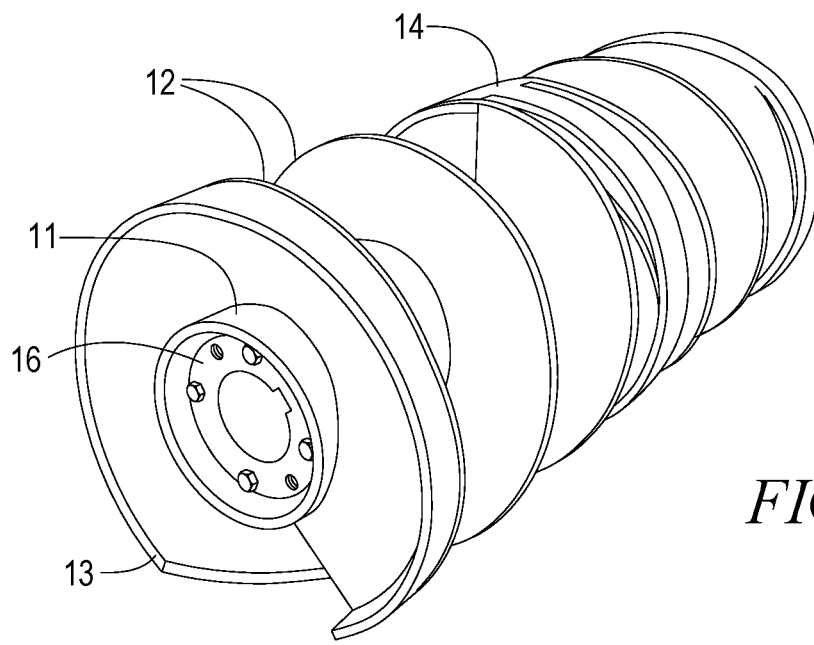
FIG. 3 is an end perspective view of the opposite end an embodiment of our improved pulley.
Figure 4:
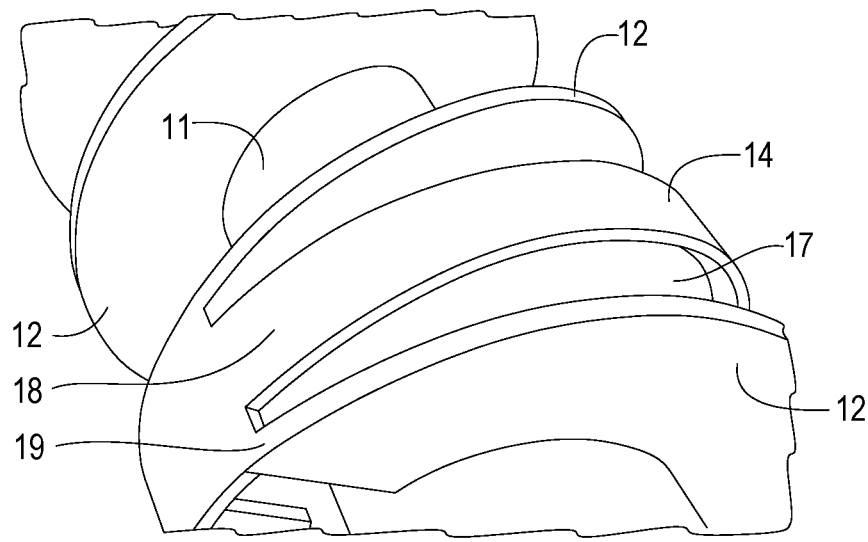
FIG. 4 is a close up view of our center bar.
Figure 5:
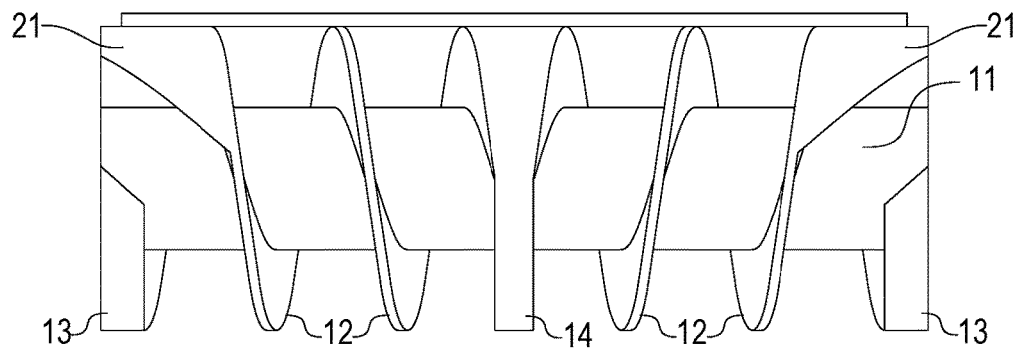
FIG. 5 is a side elevation view the improved pulley.
Figure 6:
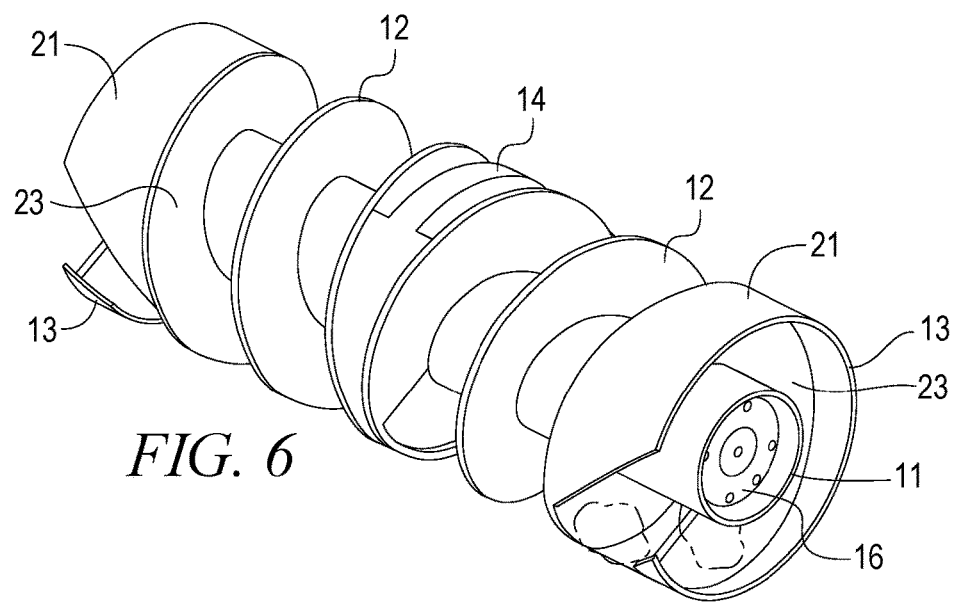
FIG. 6 is a perspective view showing tramp material being discharged.
Figure 7:
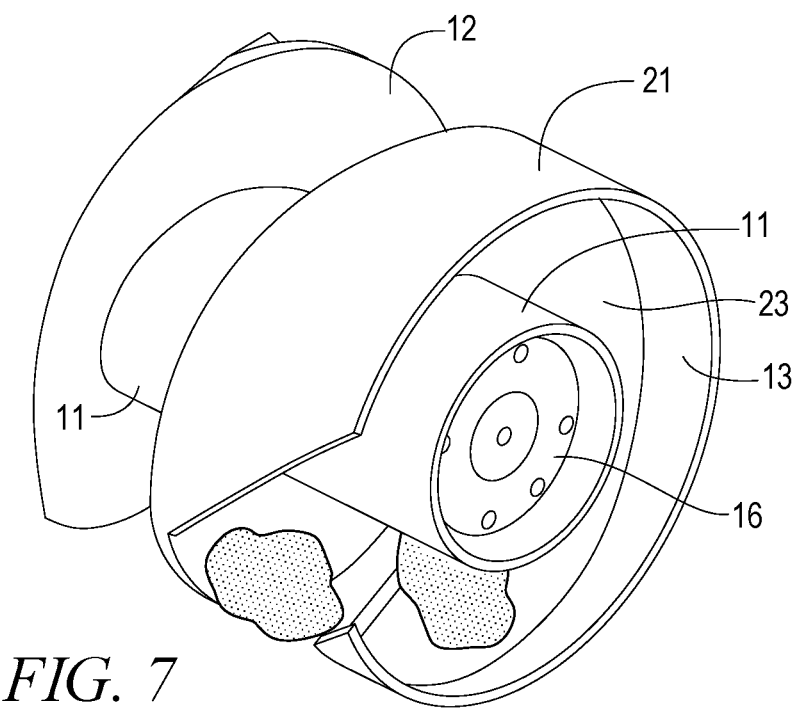
FIG. 7 is a detailed perspective view showing tramp material being discharged.
Figure 8:
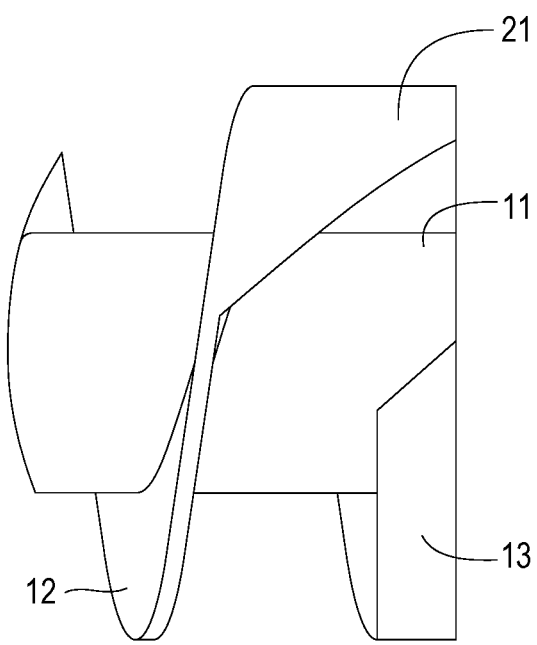
FIG. 8 is a detail view of the end of the pulley.
Figure 9:
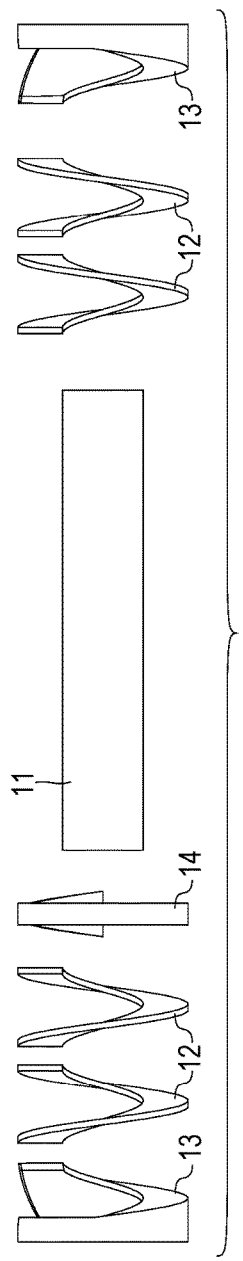
FIG. 9 is an exploded view of the modular components completely separated.
Figure 10:
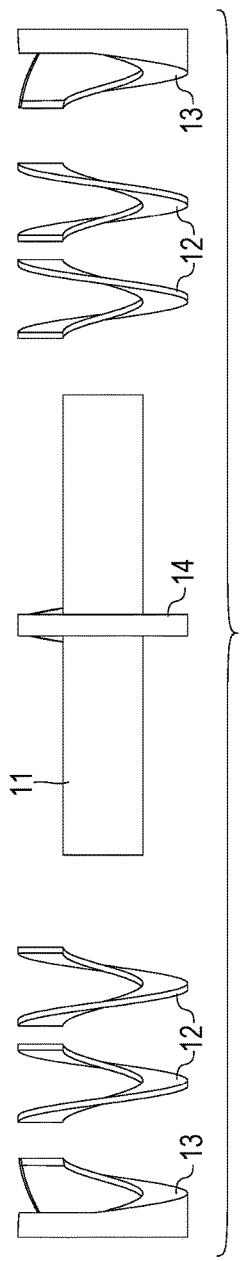
FIG. 10 is an exploded view with the center bar installed on the core.
Figure 11:
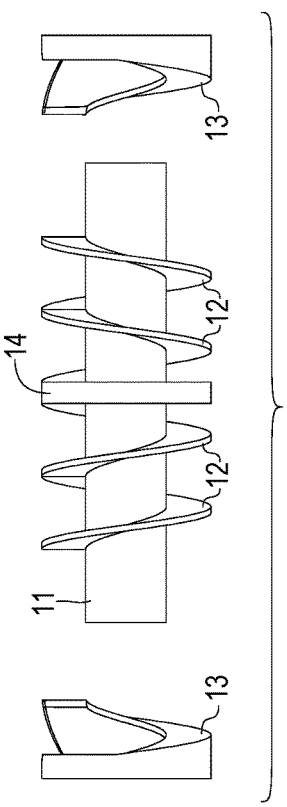
FIG. 11 is an exploded view with the center bar and flights installed on the core.

Referring to the drawings for a clearer understanding of the invention, it will be seen that our pulley utilizes a standard core 11 having a set diameter. This generally tubular member meets CEMA/ANSI specifications is the main building block of our pulleys. Core 11 is to be utilized throughout the various sizes of pulleys to be kept in inventory, thus the core 11 may be used in our products ranging from 12 to 24 inches in diameter and 26 to 63 inch in face width. The figures show that the end face 16 of the core if fitted with hubs and bushings to allow the pulley to be mounted to the conveyor frame as is well known and understood.

Mounted on core 11 at or near the center thereof is our reinforced center section 14 which provides support over a wide area in the center of the roller pulley. Reinforced center section 14 includes an inner disc 17 and wide annulus 18 that provides support and stability to the belt. The disclosure is not intended to be limiting but in the interest of clarity, annulus 18 is an abrasion resist steel, such as an AR-400 or the like,. It will be appreciated that the outer diameter of the reinforced center section 14 will be dependent on the application and system in which the pulley will be used, however the inner diameter of the inner disc 17 of reinforced center section 14 will always match the outer diameter of the core 11. The annulus 18 increases in width about the circumference of the inner disc 17 to provide mating attachment regions 19 for a plurality of spiral flight sections 12 which are welded to core 11 and reinforced center 14 such that opposing spiral flights extend from the reinforced center section 14 towards the ends of core 11. In this regard, it will be appreciated that by providing additional support at the center of the belt, material savings may be realized in the flight sections thus, by way of example the annulus 18 may vary from about 2 inches in width to about 4 inches in width and the spiral flights may have a thickness of about ½ inch. It should also be understood that the spiral flight sections also have an inner diameter commensurate with the outer diameter of core 11 and an outer flight diameter dependent upon the application and system in which they are employed.

At the outer ends of core 11, we mount discharge plows 13. Like the reinforced center section 14, the discharge plows have a wider contact surface 21 made from abrasion resistant steel that supports and stabilizes the belt. By way of example, contact surface may have a width that varies from about 2 inches to about 6 inches. By providing the needed belt support, the discharge plows allow wider flight spacing and the elimination a contact bar between the flights which allows larger material to move freely through the flights without getting jammed to the peripheral edges of the pulley. The elimination of the contact bar between flights also belt flapping as the bars impact the belt and therefore improves the belt to trough sealing capabilities of the system. The spiral flight sections also serve to urge the belt outwardly from the center of the pulley assisting in maintaining the belt in proper alignment and orientation.

The discharge plows also collect and discharge material down and away from the belt acting as the terminal discharge for the spiral flight sections 12 which also provide and auger like action urging any tramp material retained in the pulley outwardly towards the discharge plows. The discharge plow continues the spiral design and forming a terminal spiral wall 23 that progressively forces unwanted material to the end of the core where the material can be collected and discharged down and away from the belt, bearings, take-ups, maintenance equipment, and personnel. That is to say, as the core 11 and discharge plow rotate material carried by the spiral sections or discharge plow is urged laterally and falls from the discharge plow as the plow turns.

The combination of the reinforced center section 14 with its wide annulus 18 and the wide face 21 of the discharge plows 13 allow for wider spacing of the spiral flight sections and elimination of a contact bar normally found in open pulley designs which reduces material and labor cost and also speeds up the production time in as much as there is no time spent on affixing the contact bars to the assembly and eliminating the bars reduces the impact the belt as it moves over the pulley. We are further able to reduce cost by optimizing the metal thickness in the spiral flights that could be utilized to support the belt and create the appropriate cross section to maximize the life of the flight in consideration of wear. Further, there is no discontinuity in the roller to either trap tramp material or to bump or impact the belt as it moves over the pulley.

While in the foregoing specification this invention has been described in relation to certain embodiments thereof, and many details have been put forth for the purpose of illustration, it will be apparent to those skilled in the art that the invention is susceptible to additional embodiments and that certain of the details described herein can be varied considerably without departing from the basic principles of the invention.

What we claim is:

1. A roller pulley for use in a belt conveyor system wherein a moving belt passes over a series of pulleys mounted to transverse shafts supported on an elongated support frame, comprising:
    a. an elongated core rotatably mounted to said frame for rotation about a longitudinal axis of said core;
    b. a central support section affixed to said core for rotation therewith, said central support section having a circumferential width sufficient to provide support to said belt and a load carried thereby;
    c. a plurality of spiral flight sections affixed to said core and said central support section for concomitant rotation therewith; and
    d. a pair of discharge plows mounted on said elongated core proximal the ends thereof, each of said discharge plows connected to one of said plurality of spiral flight sections and having a circumferential width sufficient to provide support to said belt and a load carried thereby;
    e. wherein said plurality of spiral flight sections are mounted to said elongated core to urge tramp material laterally along said elongated core from a center of said core to said pair of discharge plows, each of said discharge plows including a terminal spiral wall mounted to an adjacent spiral flight section such that each said discharge plow forms a continuation of said adjacent spiral flight section to urge the tramp material outwardly and downwardly away from said elongated core.

2. A roller pulley as defined in claim 1 wherein said core has an outside diameter of between 12 and 24 inches.

3. A roller pulley as defined in claim 1 wherein said central support section includes a disk mounted to said elongated core proximate the center of said elongated core and extending radially therefrom, said disk carrying an annulus for supporting said belt.

4. A roller pulley for use in a belt conveyor system wherein a moving belt passes over a series of pulleys mounted to transverse shafts supported on an elongated support frame, comprising:
    a. an elongated core rotatably mounted to said frame for rotation about a longitudinal axis of said core;
    b. a central support section affixed to said core for rotation therewith, said central support section having a circumferential width sufficient to provide support to said belt and a load carried thereby;
    c. a plurality of spiral flight sections affixed to said core and said central support section for concomitant rotation therewith; and
    d. a pair of discharge plows mounted on said elongated core proximal the ends thereof, each of said discharge plows connected to one of said plurality of spiral flight sections and having a circumferential width sufficient to provide support to said belt and a load carried thereby;
    e. wherein said plurality of spiral flight sections are mounted to said elongated core to urge tramp material laterally along said elongated core from a center of said core to said pair of discharge plows, each of said discharge plows including a terminal wall mounted to an adjacent spiral flight section to urge the tramp material outwardly and downwardly away from said elongated core;
    f. wherein said central support section includes a disk mounted to said elongated core proximate the center of said elongated core and extending radially therefrom, said disk carrying an annulus for supporting said belt;
    g. wherein said annulus and each said discharge plow are more than three times as wide as an individual flight in said plurality of spiral flights.

5. A roller pulley for use in a belt conveyor system wherein a moving belt passes over a series of pulleys mounted to transverse shafts supported on an elongated support frame, comprising:
    a. an elongated core rotatably mounted to said frame for rotation about a longitudinal axis of said core;
    b. a central support section affixed to said core for rotation therewith, said central support section having a circumferential width sufficient to provide support to said belt and a load carried thereby;
    c. a plurality of spiral flight sections affixed to said core and said central support section for concomitant rotation therewith; and
    d. a pair of discharge plows mounted on said elongated core proximal the ends thereof, each of said discharge plows connected to one of said plurality of spiral flight sections and having a circumferential width sufficient to provide support to said belt and a load carried thereby;
    e. wherein said plurality of spiral flight sections are mounted to said elongated core to urge tramp material laterally along said elongated core from a center of said core to said pair of discharge plows, each of said discharge plows including a terminal wall mounted to an adjacent spiral flight section to urge the tramp material outwardly and downwardly away from said elongated core;
    f. wherein each said discharge plow includes a spiral wall secured to said core and extending radially therefrom, said spiral wall abutting and affixed to said one of said plurality of spiral flight sections, and a peripheral flange extending partially around said core and spiral wall, said flange mounted orthogonally to said spiral wall, said flange having a width converging toward said spiral wall.

6. A method of fabricating a roller pulley for use in a conveyor wherein a driven belt is supported on a plurality of pulleys mounted for rotation on shafts supported on a frame, comprising the steps of:
   a. forming a tubular steel core including opposing end plates for mounting to one of the shafts;
   b. forming a radially extending center section having an inner diameter commensurate with an outer diameter of said core and securing said center section to said core approximately equally distant between said end plates;
   c. forming a plurality of spiral flight sections and securing them to said core and said center section on each side of said center section such that said flight sections are in opposite sense from each other; and
   d. forming a pair of discharge plows with each discharge plow having a terminal spiral wall and affixing each discharge plow to an end of said core and to an adjacent spiral flight section such that each said discharge plow forms a continuation of said adjacent spiral flight section to urge tramp material outwardly and downwardly away from said core.

7. The method as defined in claim 6 wherein said core has a length of about 26 to about 63 inches.

8. The method as defined in claim 6 wherein said center section has an outside diameter of between about 12 and about 24 inches.

9. The method as defined in claim 6 wherein each of said plurality of spiral flight sections has an outer diameter of between 12 and 24 inches.

10. A method of fabricating a roller pulley for use in a conveyor wherein a driven belt is supported on a plurality of pulleys mounted for rotation on shafts supported on a frame, comprising the steps of:
   a. forming a tubular steel core including opposing end plates for mounting to one of the shafts;
   b. forming a radially extending center section having an inner diameter commensurate with an outer diameter of said core and securing said center section to said core approximately equally distant between said end plates;
   c. forming a plurality of spiral flight sections and securing them to said core and said center section on each side of said center section such that said flight sections are in opposite sense from each other; and
   d. forming a pair of discharge plows with each discharge plow having a terminal discharge and affixing each discharge plow to an end of said core and to an adjacent spiral flight section such that each said discharge plow forms a continuation of said adjacent spiral flight section;
   e. wherein the step of forming said center section includes forming a disk having an inner diameter equal to the outer diameter of said tubular core and affixing a transverse circumferential flange to said disk, said flange adapted to engage said spiral flight sections.

11. The method as defined in claim 10 wherein said step of forming a pair of discharge plows comprises forming a discharge plow having a spiral wall having an inner diameter commensurate with the outer diameter of said core and affixing a transverse flange to said spiral wall such that said spiral wall and the edge of said flange converge towards the end of said core.

12. A method of fabricating a roller pulley for use in a conveyor wherein a driven belt is supported on a plurality of pulleys mounted for rotation on shafts supported on a frame, comprising the steps of:
   a. forming a tubular steel core including opposing end plates for mounting to one of the shafts;
   b. forming a radially extending center section having an inner diameter commensurate with an outer diameter of said core and securing said center section to said core approximately equally distant between said end plates;
   c. forming a plurality of spiral flight sections and securing them to said core and said center section on each side of said center section such that said flight sections are in opposite sense from each other; and
   d. forming a pair of discharge plows with each discharge plow having a terminal discharge and affixing each discharge plow to an end of said core and to an adjacent spiral flight section such that each said discharge plow forms a continuation of said adjacent spiral flight section;
   e. wherein said step of forming a pair of discharge plows comprises forming a discharge plow having a spiral wall having an inner diameter commensurate with the outer diameter of said core and affixing a transverse flange to said spiral wall such that said spiral wall and the edge of said flange converge towards the end of said core.

* * * * *